Patented Feb. 18, 1947

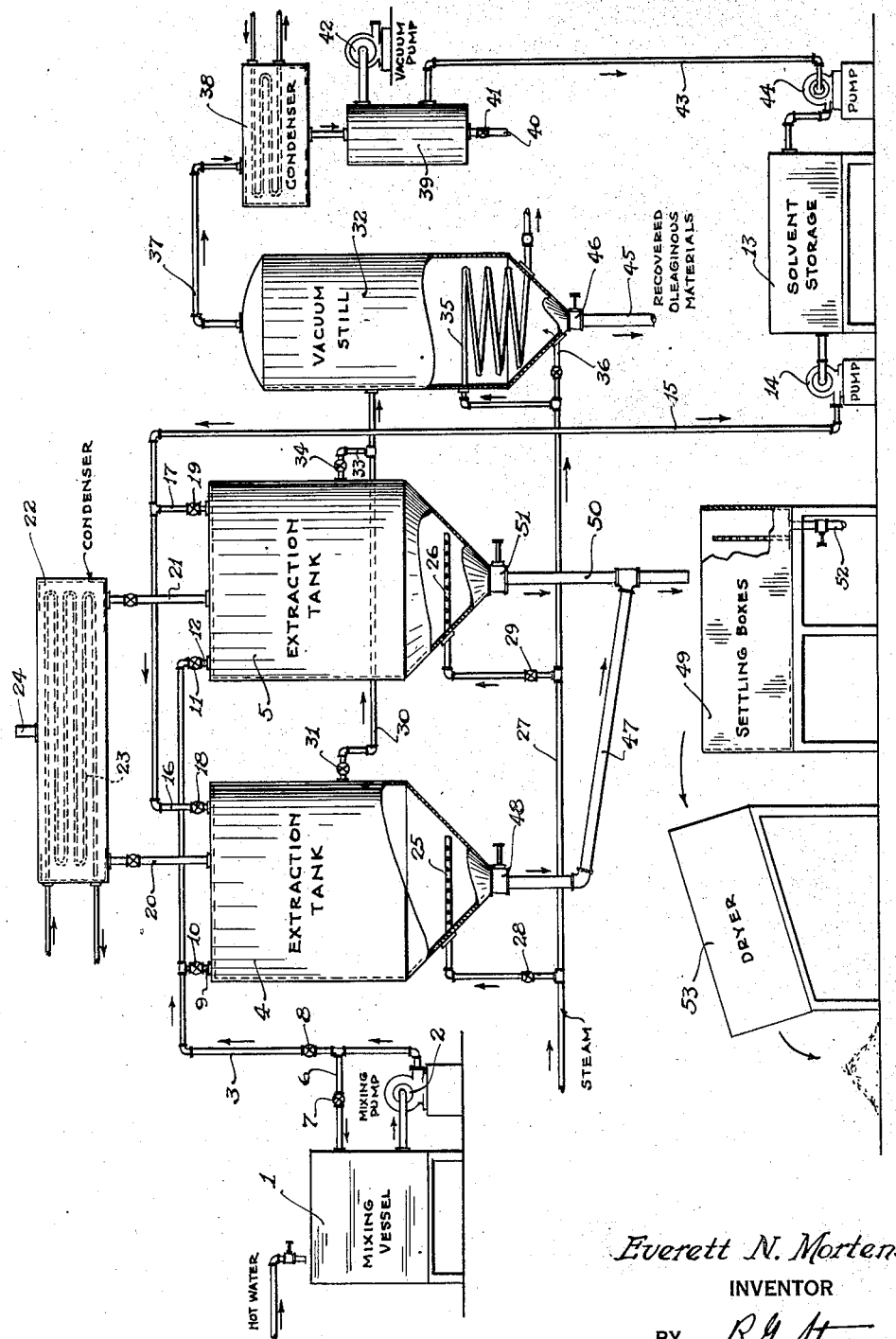

2,416,196

UNITED STATES PATENT OFFICE 2,416,196

METHOD FOR SOLVENT EXTRACTION OF FATTY MATERIALS

Everett N. Mortenson, Chicago, Ill., assignor to Industrial Patents Corporation, Chicago, Ill., a corporation of Delaware Application January 28, 1944, Serial No. 520,000

10 Claims. (Cl. 260—412.8)

This invention relates to and has to do particularly with the treatment of a relatively solid carrier material for the removal of oleaginous substances therefrom.

The solvent extraction method has been widely employed for the removal of oleaginous material from solid matter in a relatively dry state. Such methods are impractical, however, when applied to materials containing substantial amounts of water, since the water must be largely removed to avoid the formation of troublesome emulsions of solvent and water under the conditions of agitation and heat ordinarily employed in the extraction process. The necessity of preliminarily drying the material to be extracted considerably deteriorates the oleaginous material by polymerization and decomposition, particularly where such material is of a fatty nature. This operation likewise involves the use of special drying equipment and requires large expenditures of heat.

In order to avoid deterioration and facilitate the recovery of oleaginous materials, it has been proposed to extract wet solids under conditions of heat and agitation to drive off the water and all or part of the solvent during the process, thereby preventing emulsion formation. In the event that the solvent is substantially removed, it becomes necessary to continuously replenish the supply during the extraction. Likewise, the elimination of the water content by this method requires a tremendous expenditure of heat since not only must the latent heat of vaporization be supplied for the solvent and water, but heat must be furnished to raise the additional solvent to the extraction temperature. This method of extraction is actually closely related to the aforesaid dry extraction with solvents since the material is substantially dry after the water has been vaporized. A particular weakness of this method is that the extraction is not complete, since a small amount of the miscella remains absorbed in the pores of the material.

Methods of fat recovery have also been practiced on the dry and wet basis without the use of solvents. The dry rendering of fatty material has been employed to a great extent in the packing industry as a means of recovering fat from adipose tissue. Also, the recovery of oil from cottonseeds and soy beans by the use of expellers is broadly considered a dry rendering process. The wet method of rendering for the recovery of fatty matter from pork adipose tissue usually requires pressure cooking of the adipose tissue in the presence of steam and water. The application of such prior methods, however, has not been satisfactory for the recovery of fats present in relatively small amounts in the solid matter without the substantial deterioration of the fatty material.

It is an object of this invention to provide a rapid and efficient method of extracting oleaginous substances from solid carrier material containing an appreciable amount of water.

It is also an object of this invention to provide a method for the elimination of emulsions formed during the extraction of oleaginous substances with solvents.

It is another object of the invention to provide a method for the recovery of oleaginous values without substantial deterioration thereof.

Other objects and advantages, if not specifically pointed out, will be apparent to those skilled in the art from the following detailed description of what is now considered to be a preferred embodiment of the invention taken in conjunction with the appended drawing.

In general, the method of the invention comprises agitating an aqueous slurry of material containing an oleaginous substance in the presence of a solvent for the oleaginous substance while heating the mixture to a temperature below the boiling point of the solvent to substantially extract the oleaginous substance, reducing the rate of agitation without substantially lowering the temperature of the mixture to cause a separation of a solvent layer containing the extracted oleaginous substance and a water layer and recovering the oleaginous substance by removal of the solvent. It is preferred to employ a solvent having a boiling point higher than water and conduct the extraction process at a temperature in the region of the boiling point of the water at the existing conditions in order to agitate the mixture and increase the solvent action.

It has been discovered that the employment of a solvent of higher boiling point than water under conditions of condensation and reflux greatly facilitates the extraction of oleaginous substances from an aqueous slurry of the material. Since the water is not substantially removed from the mixture, the solvent is available to promote the most efficient extraction under the influence of the rapidly boiling water. Also, by refluxing the mixture, sufficient water remains therein to provide agitation and facilitate the solvent action until the process is completed. In the event that the extraction is carried out at temperatures below the boiling point of the water, agitation may be provided by mechanical means.

During the extraction, emulsion formation may occur to a varying degree depending upon the water content and the nature of the material being extracted. It has been discovered that reducing the rate of agitation without substantially lowering the temperature unexpectedly causes the emulsion to break down with the formation of a solvent layer containing the extracted oleaginous substance and a water layer containing extracted solid matter. Where the extraction is carried out at the boiling point of the water, the emulsion is broken by reducing the boiling rate of the mixture. The solvent layer may then be separated and treated for recovery of the oleaginous material.

The solvent employed in the process will generally depend upon the conditions under which the extraction is to be accomplished in a particular case, as well as the characteristics of the oleaginous material to be treated. Since the extraction is advantageously carried out at a temperature at least in the region of the boiling point of water, solvents immiscible with water and having a boiling point above that of water at the pressure employed are preferred.

Solvents which may be successfully employed in the extraction of oleaginous materials at temperatures above the boiling point of water include diamyl ether, di-isoamyl ether, dibutyl ether, di-isobutyl ether, di-secondary butyl ether, decane, dibutyl ketone, di-isobutyl ketone, diethyl ketone, diethyl toluene, diethyl benzenes, dipropyl ketone, di-isopropyl ketone, tetramethyl benzene (durene), ethyl amyl ether, ethyl amyl ketone, ethyl benzene, ethyl butyl ketone, methyl butyl ketone, methyl isobutyl ketone, chlorobenzene, toluene, xylene; and petroleum fractions distilling within the range of about 105° C.–250° C. or higher. For most efficient operation, the petroleum fractions of a narrow boiling range, such as from about 105° C. to 150° C., 110° C. to 120° C., 150° C. to 200° C., 170° C. to 175° C., 180° C. to 190° C., and 200° C. to 220° C., are preferred and particularly petroleum fractions boiling above 150° C. and below 250° C. with as narrow a boiling range as possible are best from the standpoint of cost, safety and solvent power. Where the extraction is to be accomplished at temperatures below the boiling point of water, a petroleum fraction having a boiling range of from 80° C. to 110° C. may be used. By the employment of petroleum fractions having a relatively narrow boiling range, the process may be standardized within considerably narrower limits than is possible with one having a relatively wide boiling range. Petroleum fractions having a relatively low initial boiling point are undesirable from the standpoint of fire hazard and, for this reason, those having a flash point by the open cup method greater than 70° C. are preferred.

Examples of oleaginous materials which may be successfully treated by the present process include the following:

1. Chemically precipitated packing house proteins which have been heat coagulated, concentrated by dewatering but not dried. Such a sludge may run from 5 per cent to 25 per cent solids but, in any case, is far too wet for the application of conventional solvent extraction methods.

2. Sump bottoms and storage settlings from tank water drawn off from the wet rendering process. These materials likewise are very high in moisture content and cannot be solvent extracted in the usual way without the formation of troublesome emulsions but may be successfully treated by the present invention.

3. Various earths and inert materials used for the bleaching, clarification or filtration of fats and oils. These materials ordinarily contain almost 20 per cent of fat by weight and being essentially dry, must be formed into a slurry by the addition of water before a satisfactory extraction by the present method can be effected.

The material containing the oleaginous substance is preferably ground or comminuted and mixed with water to form a fluid slurry. If the material is relatively dry, sufficient water is preferably added to increase the moisture content to over 20 per cent by weight. Most efficient extraction of the oleaginous substance is obtained when the moisture content constitutes from about 20 per cent to 95 per cent of the mixture, depending upon the material being treated.

The amount of solvent employed is generally governed by the amount of fatty or greasy substance in the material to be extracted, since, in most cases, a direct relationship exists between the concentration of the fat in the solvent and the stability of the emulsion. It is preferred to use sufficient solvent to give a low concentration of fat in the solvent medium. Concentrations of fat or greasy matter in the solvent comparable to the percentage concentration of fat or greasy matter in the dry solid material have been found to give successful results in carrying out the present method. When these concentrations are employed, the emulsion formed during the extraction process is readily broken out on reducing the rate of agitation. It has also been found that good results are obtained when the concentration of fat in the solvent does not exceed 15 to 25 per cent after complete transfer of fat from the material to the solvent has been effected. In every case, sufficient solvent is used so that, when the extraction process is complete, the grease content of the solvent will not exceed that point of equilibrium at which residual grease is left unextracted.

The drawing illustrates diagrammatically a form of apparatus suitable for the wet reflux extractions of fatty matter from spent bleaching earth.

Referring more particularly to the drawing, spent bleaching earth used in the bleaching of lard and an equal amount of water heated to facilitate mixing are introduced into a vessel 1. The wet material is then passed to a centrifugal mixing pump 2 to form a homogeneous slurry of bleaching earth and water and thereafter, through a conduit 3 to one of two extraction tanks 4 and 5. A branch conduit 6 serves for returning all or part of the slurry to vessel 1 for producing a more uniform mixture and valves 7 and 8 for controlling the relative flow of material to the aforesaid extraction tanks. The slurry may then be introduced into the extraction tank 4 through conduit 9 and valve 10, valve 11 in conduit 12 leading to the extraction tank 5 being closed. When extraction tank 4 is about half full, valve 10 is closed. The mixture in vessel 1 is thereafter circulated continuously through conduit 6 to maintain a uniform slurry of the spent earth and water.

A solvent, preferably one having a higher boiling point than water, is introduced into extraction tank 4 from a solvent storage tank 13 by means of pump 14 and conduits 15 and 16. A branch conduit 17 is provided for conveying solvent to extraction tank 5 and valves 18 and 19 serve to control the solvent flow through conduits 16 and 17 respectively.

Tanks 4 and 5 are connected by conduits 20 and 21 to a reflux condenser 22 of any known type which may be cooled by a heat exchange medium circulated through coil 23. The reflux condenser is provided with a vent 24 by virtue of which the extraction tanks 4 and 5 are maintained at approximately atmospheric pressure during the extraction process. Heat in the form of steam is supplied to the contents of extraction tanks 4 and 5 through diffusers 25 and 26 which are connected to a steam line 27. Valves 28 and 29 control the supply of steam to diffusers 25 and 26.

When the calculated amount of solvent has been introduced into extraction tank 4, valve 18 is closed and steam valve 28 is opened to heat the mixture of slurry and solvent to the boiling point of the water contained therein. The mixture begins to boil and the vapors to reflux when the sum of the partial pressures of water and solvent exceed atmospheric pressure. Sufficient heat is supplied in this manner to cause the mixture to boil vigorously. During the ebullition, the two phases become a homogeneous emulsion of small particles and the grease begins to diffuse from the water layer solids into the solvent layer. Since the solvent has a higher boiling point than water, very little solvent distills thereby providing the most favorable euqilibrium condition for complete recovery of the fatty material. Vaporized water and solvent are condensed in condenser 22 and return to the extraction tank 4 via conduit 20. The solvent action is greatly augmented by the vigorously boiling water. When the extraction is substantially complete, the rate of agitation is substantially reduced to break the emulsion. By reducing the supply of steam to about 50 per cent or less and allowing the mixture to slowly simmer for a period of time depending upon the nature of the material, the solvent cracks out bringing the dissolved fat with it.

After the emulsion is broken, the mixture separates into two clear cut layers. The top solvent layer containing extracted fatty material is withdrawn through a conduit 30 and valve 31 to a vacuum still 32. Extraction tank 5 is similarly connected with the vacuum still by conduit 33 and valve 34. The vacuum still is heated to about 220° F. by steam admitted to coil 35 from the main steam line 27. The solvent vapors distill off from the fat and are carried through conduit 37 to condenser 38 and separatory tank 39, wherein any distilled water is removed through conduit 40 and valve 41. A vacuum pump 42 is designed to maintain a vacuum of about 26 inches of mercury in the still. The solvent is withdrawn from the separatory tank through conduit 43 and returned to the solvent storage tank 13 for reuse by a pump 44.

The last traces of solvent may be stripped from the fatty material by a steam jet 36. The recovered fatty material is removed from the system through conduit 45 controlled by a valve 46.

The lower water layer containing the fat free extracted earth is withdrawn from the extraction tank 4 through conduit 47 and valve 48 to settling boxes 49 and allowed to settle. Extraction tank 5 is similarly provided wtih a conduit 50 and valve 51 connected with conduit 47. The supernatant water is drawn off through line 52 and the earth manually removed from the settling boxes and charged into a kiln 53 to be fired and prepared for reuse.

Fuller's earth extracted and treated in the foregoing manner shows substantially 100 per cent of its original bleaching potency. The fatty material recovered is not deteriorated in any way and constitutes over 95 per cent of that contained in the unextracted earth.

The process may be made substantially continuous by passing the wet slurry of material first to the extraction tank 4 and, thereafter, to extraction tank 5. While the charge in one of the extraction tanks is being subjected to extraction, the previously extracted charge in the other tank may be treated for recovery of the extracted fatty material and solvent in the vacuum still.

In a specific example, 1,000 grams of spent fuller's earth containing about 20 per cent fat from the decolorization of lard were charged into a vessel and treated with low pressure steam to form a slurry. The slurry was charged into extraction tank and 2,000 cubic centimeters of Deobase (a petroleum fraction having a boiling range from 370° F. to 480° F. and a flash point of from 170° F. to 180° F.) were then added to the extraction tank. The solvent amounted to a ratio of about 1½ pounds of solvent per pound of dry earth. Live steam was fed from the steam line at a sufficiently rapid rate to thoroughly mix the earth, water and solvent and vigorously agitate the resulting mixture. A rapid rate of extraction was maintained for about 30 minutes during which time a very intimate contact of the solvent, water, earth and grease was effected. At the end of this time, the amount of steam fed into the tank was markedly reduced until a very gentle boiling of the mixture took place for 20 to 30 minutes. The emulsion then suddenly broke and the solvent layer cracked out cleanly, carrying the grease with it. The solvent containing the fatty material was subjected to vacuum distillation in the still, followed by injection of steam to completely strip off the solvent. The solvent was recovered for reuse in the process. The fatty material was drawn off at the bottom of the still and found to constitute a yield of about 98 per cent of the original fat content of the earth.

It is important that the rate of ebullition be substantially reduced during the cracking out period to completely break the emulsion. If the agitation and heating are discontinued, a complete separation does not occur.

Although the process has been described in connection with the recovery of fatty material from decolorizing earths, it is readily applicable to the treatment of any material containing oleaginous substances whether the object is the recovery of the oleaginous matter or the purification of the carrier. It is to be understood that the conditions employed may vary over a wide range depending upon the nature of the oleaginous substances to be extracted and the physical characteristics of the carrier material. The process is applicable to the rejuvenation of catalysts and contact material employed in the processing of mineral oils. Conventional solvent extraction methods for these materials on a dry basis are not fully successful as the material inevitably retains a small quantity of absorbed solvent and oily matter. By the present method, a clear cut separation of the miscella containing the extracted oleaginous substances and the water containing the extracted solid matter is obtained. The completely extracted solid matter may be recovered substantially free of solvents and oleaginous materials.

Obviously, many modifications and variations of the invention specifically described herein may be made without substantially departing from the spirit and scope thereof and, therefore, only such limitations should be imposed as are indicated in the appended claims.

I claim:

1. The method of recovering oleaginous substance from material containing the oleaginous substance, which comprises rapidly agitating an aqueous slurry of said material in the presence of a solvent for the oleaginous substance having a boiling point higher than water; said agitation being performed while maintaining a temperature at least in the region of the boiling point of water to substantially extract said oleaginous substance from the material but with the formation of an emulsion of solvent, oleaginous substance, and water; then reducing the rate of agitation without substantially lowering the temperature of the mixture to cause a breaking of the emulsion and the separation of a solvent layer containing the extracted oleaginous substance from the aqueous slurry; and thereafter recovering the oleaginous substance by the removal of the solvent.

2. The method of recovering oleaginous substance from material containing the oleaginous substance, which comprises rapidly boiling an aqueous slurry of said material containing from about 20 per cent to 95 per cent water in the presence of a water immiscible solvent for the oleaginous substance having a boiling point higher than water whereby an emulsion is formed of the solvent, water, and the oleaginous substance; condensing and refluxing the vapors flowing from the mixture to substantially extract said oleaginous substance from the material in the presence of a substantial quantity of water; then reducing the rate of boiling without substantially lowering the temperature of the mixture to cause the breaking of the emulsion and separation of a solvent layer containing the extracted oleaginous substance from the aqueous slurry; and thereafter recovering the oleaginous substance by the removal of the solvent.

3. The method of recovering oleaginous substance from material containing the oleaginous substance, which comprises heating an aqueous slurry of said material in the presence of a water immiscible solvent for the oleaginous substance, said solvent having a boiling point higher than water; refluxing and relatively violently boiling the mixture to substantially extract said oleaginous substance from the material such that an emulsion of solvent, water, and oleaginous substance is produced; reducing the rate of heat input to cause a reduction in the boiling action whereby to effect the breaking of the emulsion; and then separating the solvent layer containing the extracted oleaginous substance from the aqueous slurry.

4. The method of recovering oleaginous substance from material containing the oleaginous substance, which comprises heating an aqueous slurry of said material to the boiling point of the mixture in the presence of a water immiscible solvent for the oleaginous substance, the solvent having a boiling point higher than water; refluxing and relatively violently agitating the mixture to substantially extract the oleaginous substance from said material under conditions which produce an emulsion of solvent, water, and oleaginous substance; the amount of solvent being at least sufficient to provide a maximum concentration not greater than about 15 per cent of the oleaginous substance in the solvent; reducing the rate of heat input to reduce the degree of agitation materially while maintaining the boiling temperature to cause the breaking of the emulsion and separation of a solvent layer containing the extracted oleaginous substance from the aqueous slurry.

5. The method of recovering oleaginous substance from material containing the oleaginous substance, which comprises vigorously agitating a comminuted aqueous slurry of said material in the presence of a water immiscible solvent for the oleaginous substance, said solvent having a boiling point higher than water; performing said agitation while maintaining the temperature of the slurry at its boiling point and refluxing the vapors flowing from the mixture; maintaining at least sufficient solvent in the mixture to provide a maximum concentration not greater than about 15 per cent of the oleaginous substance in the solvent until extraction is substantially complete; said agitation forming an emulsion between the solvent, the water, and the oleaginous substance; and then reducing the rate of heat input to substantially reduce the rate of agitation while maintaining the temperature of the bath to cause the breaking of the emulsion and separation of a solvent layer containing the extracted oleaginous substance from the aqueous slurry.

6. The method of recovering oleaginous substance from material containing the oleaginous substance, which comprises agitating an aqueous slurry of said material in the presence of a solvent for the oleaginous substance while heating the mixture to a temperature below the boiling point of the solvent to substantially extract the oleaginous substance but with the formation of an emulsion of solvent, oleaginous substance, and water; and reducing the rate of agitation without substantially lowering the temperature of the mixture to cause a breaking of the emulsion and a separation of a solvent layer containing the extracted oleaginous substance from the aqueous slurry; and thereafter recovering the oleaginous substance by removal of the solvent.

7. The method of recovering oleaginous substance from material containing the oleaginous substance, which comprises agitating an aqueous slurry of said material in the presence of a solvent for the oleaginous substance consisting of a petroleum fraction distilling within the range of about 105° C. to about 250° C.; simultaneously heating the mixture to a temperature below the boiling point of the solvent to substantially extract the oleaginous substance, said heating and agitation causing the formation of an emulsion of oleaginous substance, solvent, and water; and then reducing the rate of agitation without substantially lowering the temperature of the mixture to cause a breaking of the emulsion and separation of a solvent layer containing the extracted oleaginous substance from the aqueous slurry; and thereafter recovering the oleaginous substance by removal of the solvent.

8. The method of recovering oleaginous substance from material containing the oleaginous substance, which comprises agitating an aqueous slurry of said material in the presence of a solvent for the oleaginous substance having a relatively narrow boiling range falling within the limits of above 150° C. and below 250° C.; simultaneously heating the mixture to a temperature below the boiling point of the solvent to substantially extract the oleaginous substance but with the formation of an emulsion composed of water, solvent, and oleaginous substance; and then reducing the rate of agitation without substantially lowering the temperature of the mixture to cause a breaking of the emulsion and a separation of a solvent layer containing the extracted oleaginous substance from the aqueous slurry; and thereafter recovering the oleaginous substance by removal of the solvent.

9. The method of recovering oleaginous substance, which comprises heating an aqueous slurry of said material to the boiling point of the mixture in the presence of a water immiscible solvent for the oleaginous substance, the solvent having a boiling point higher than that of water; relatively violently agitating the mixture to substantially extract the oleaginous substance from said material; said heating and agitation causing the formation of an emulsion composed of oleaginous substance, water, and solvent; the quantity of the solvent present being at least sufficient to provide a maximum concentration not greater than about 15% of the oleaginous substance in the solvent; reducing the rate of heat input to substantially reduce the rate of agitation while maintaining the boiling temperature to cause the breaking of the emulsion and separation of a solvent layer containing the extracted oleaginous substance from the aqueous slurry.

10. The method of recovering oleaginous substance from material containing the oleaginous substance, which comprises heating an aqueous slurry of said material to the boiling point of the mixture in the presence of a water immiscible solvent for the oleaginous substance, the solvent having a boiling point higher than water; relatively violently agitating the mixture to substantially extract the oleaginous substance from said material under conditions which produce an emulsion of solvent, water, and oleaginous substance; the amount of solvent being at least sufficient to provide a maximum concentration not greater than about 15 per cent of the oleaginous substance in the solvent; reducing the rate of heat input to reduce the degree of agitation materially while maintaining the boiling temperature to cause the breaking of the emulsion and separation of a solvent layer containing the extracted oleaginous substance from the aqueous slurry.

EVERETT N. MORTENSON.

REFERENCES CITED

The following references are of record in the file of this patent:

UNITED STATES PATENTS

| Number | Name | Date |
| --- | --- | --- |
| 1,503,751 | Dreymann | Aug. 5, 1924 |
| 807,567 | Maywald | Dec. 19, 1905 |
| 183,098 | Adamson | Oct. 10, 1876 |